United States Patent [19]
Kaplan

[11] Patent Number: 5,809,236
[45] Date of Patent: Sep. 15, 1998

[54] METHOD AND APPARATUS FOR CONTENTION RESOLUTION IN A BROADBAND NETWORK

[75] Inventor: Alan Edward Kaplan, Morris Township, Morris County, N.J.

[73] Assignee: Lucent Technologies, Murray Hill, N.J.

[21] Appl. No.: 565,528

[22] Filed: Nov. 30, 1995

[51] Int. Cl.⁶ ..................................................... G06F 13/00
[52] U.S. Cl. ................................ 395/200.31; 395/200.65
[58] Field of Search .................... 395/200.01, 200.31, 395/200.59, 200.65, 200.54; 348/7; 455/4

[56] References Cited

U.S. PATENT DOCUMENTS

| | | | |
|---|---|---|---|
| 4,271,507 | 6/1981 | Gable et al. | 370/94 |
| 5,088,024 | 2/1992 | Vernon et al. | 395/725 |
| 5,230,044 | 7/1993 | Cao et al. | 395/325 |
| 5,361,091 | 11/1994 | Hoarty et al. | 348/7 |
| 5,495,589 | 2/1996 | Mackenthun et al. | 395/200.15 |

OTHER PUBLICATIONS

*Electronics Engineering Handbook*, Fink & Christiansen, pp. 12–34 to 12–49, (McGraw Hill 1989).

Primary Examiner—Mehmet B. Geckil

[57] ABSTRACT

A user interface for resolving contention for a data channel is coupled to a broadband network having a plurality of user interfaces and a distribution hub. The user interface comprises a contention circuit for generating a contention signal in substantial absence of a common frequency with other user interfaces. The contention signal is a contention request for allocation of a data channel on the broadband network. A sensor for sensing other contention signals on the broadband network determines a status of the contention request. In a further enhancement, the contention signal is related to the unique id number. This relationship in a further enhancement is based on a multiple of a step frequency relative to a base frequency, wherein the multiple is related to the unique id number. In a yet further enhancement, a contending user having a highest unique id number is given access to the data channel. In yet another further enhancement, the user interface contending for the data channel employs a unique binary address to bid for said data channel by expressing a signal corresponding to a value of a bit of said unique binary address. Each of the user interfaces having a "0" bit value drops out of the bidding while each of the user interfaces having a "1" bit value continues bidding with a next bit, continuing until only one user interfaces remains.

24 Claims, 4 Drawing Sheets

METHOD AND APPARATUS FOR CONTENTION RESOLUTION IN A BROADBAND NETWORK

FIELD OF THE INVENTION

This invention relates to data channel contention, and more particularly to contention a data channel in a broad bandwidth network.

BACKGROUND OF THE INVENTION

The use of an existing cable infrastructure for data transmission is desirable because of low cost and rapid implementation. While cable television systems are primarily concerned with providing high quality video signals to system users, interactive communications has been developed to allow the system user to interact with the program source. However, the available bandwidth is limited and must be shared by multiple users. When two or more users attempt to utilize the same resource, contention results. It is necessary to implement a scheme for contention resolution so that multiple users can operate in the available limited bandwidth.

One such system of contention resolution that is currently utilized in a wired or bus is known as a countdown scheme. Implementations of the countdown scheme utilize a baseband signal applied to the bus. Therefore, the current implementation of the countdown scheme are limited to short distances and have been utilized in data only environments.

In order to reliably manage contention by multiple system users for the data channel, each system user must be able to determine when another system user is contending for the data channel and when they have access to the data channel.

SUMMARY OF THE INVENTION

In accordance with the present invention, an apparatus and a scheme for resolving contention for a data channel in a broadband network is provided. A user interface is coupled to a broadband network having a plurality of user interfaces and a distribution hub. The user interface comprises a contention circuit for generating a contention signal in substantial absence of a common frequency with other user interfaces. The contention signal is a request for allocation of a data channel on the broadband network. A sensor for sensing other contention signals on the broadband network determines a status of the contention request.

In a further enhancement, the contention signal is related to the unique id number. This relationship in a further enhancement is based on a multiple of a step frequency relative to a base frequency, wherein the multiple is related to the unique id number. In a yet further enhancement, a contending user having a highest unique id number is given access to the data channel.

In yet another further enhancement, the user interface contending for the data channel employs a unique binary address to bid for said data channel by expressing a signal corresponding to a value of a bit of said unique binary address. Each of the user interfaces having a "0" bit value drops out of the bidding while each of the user interfaces having a "1" bit value continues bidding with a next bit, continuing until only one user interfaces remains.

A method in accordance with the present invention for allocating a data channel in a cable network is also described.

DESCRIPTION OF THE DRAWINGS

The present invention is described in detail below in conjunction with the drawings, of which.

DETAILED DESCRIPTION OF VARIOUS ILLUSTRATIVE EMBODIMENTS

Although the present invention, a system for high speed contention/data transmission within a cable transmission system, is particularly well suited for use with a broadband network such as a cable TV plant, which is a communication system that simultaneously distributes several different channels of video programs and other information via a coaxial cable, and shall be described with respect to this application, the methods and apparatus disclosed here in can be applied to other transmission media utilized in other broadband networks including, for example, Local Area Networks (LANs), and community antenna television (CATV) networks. The present invention can also be utilized to content on networks having multiple cables connected to a distribution hub for a single data channel connected to the distribution hub.

Figure 1:
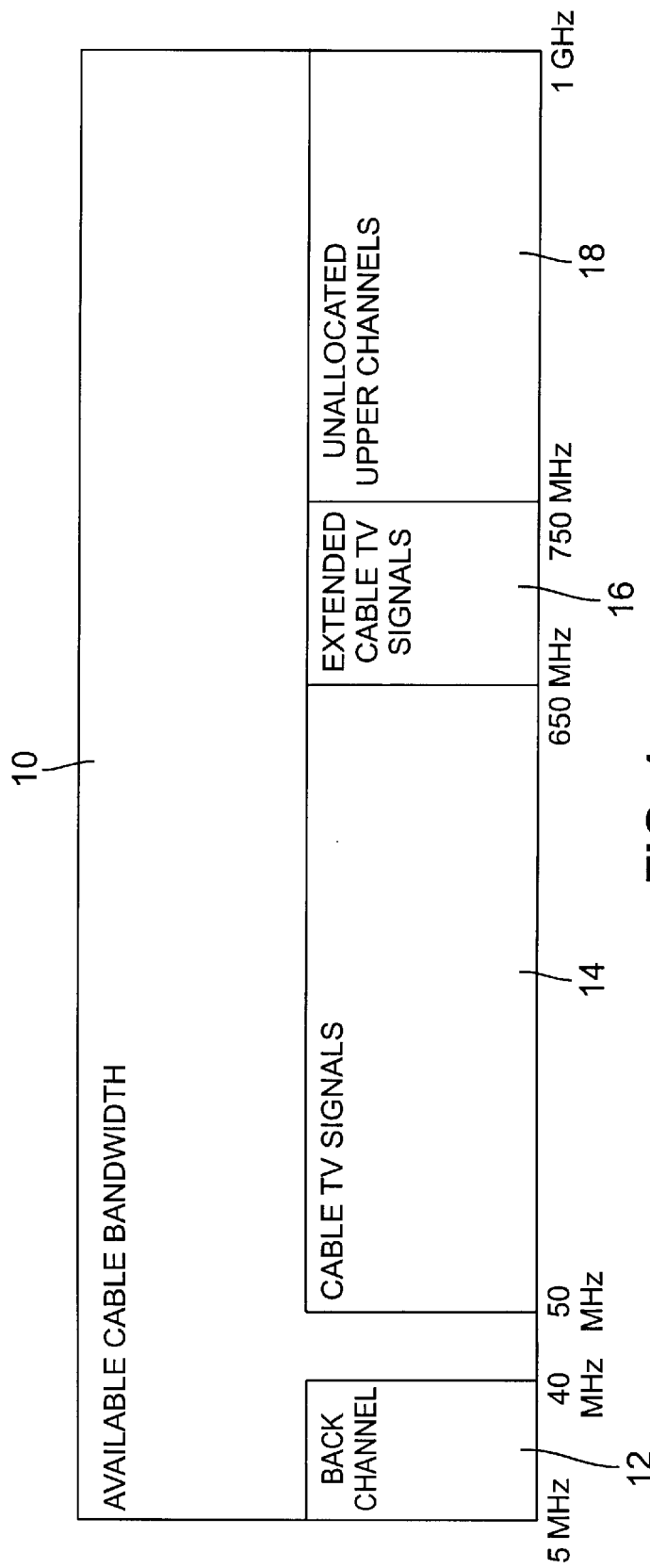
FIG. 1 shows the cable bandwidth allocation.

Referring now to FIG. 1 there is illustrated a graphical representation of the cable bandwidth allocation. The available cable bandwidth 10 is limited by the transmission characteristics of the media and associated components. While this may typically be thought of extending to 1 GHz, the cable loss increases with increasing frequency, thus effectively limiting the total available cable bandwidth for allocation. The available cable bandwidth 10 can be divided into four major portions. The lowest frequency portion is known as the back channels 12 and typically covers the spectrum from 5 to 40 MHz. The next frequency portion, the cable TV signals 14, typically covers the spectrum from 50 MHz to 650 MHz. Optionally, in extended cable TV systems, the spectrum from 650 MHz to up to 750 MHz may be utilized for extended cable TV signals 16. The unallocated upper channels 18 are limited by the transmission characteristics of the cable TV plant.

Figure 2:
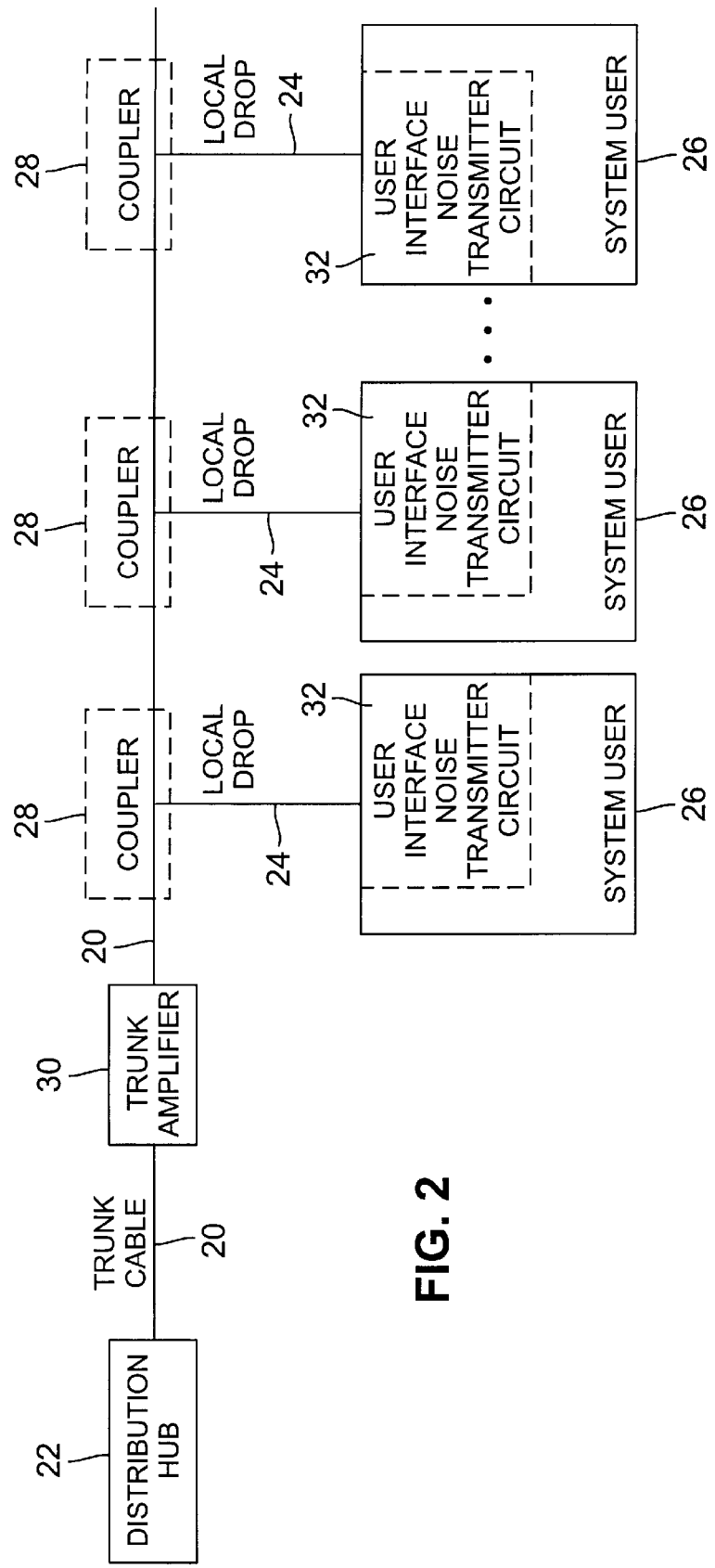
FIG. 2 shows a schematic illustration of an exemplary cable TV plant that resolves data channel contention in accordance with the present invention.

Referring to FIG. 2 there is shown an exemplary cable TV plant. The cable TV plant consists of a trunk cable 20 which is coupled to a distribution hub 22. Local line drops 24 connect the system users 26 to the trunk cable 20 through couplers 28. In order to maintain the signal level well above the noise level, trunk amplifiers 30 are often positioned along the trunk cable 20, at particular intervals, typically 1400 to 4000 feet, depending upon the diameter of the trunk cable 20 and associated signal attenuation. Each trunk amplifier 30 is typically comprised of two broadband push-pull amplifiers which provide two-way transmission on the trunk cable 20. One amplifier to provides upstream (signals from system users 26 to the distribution hub 22) amplification for the back channel 12 and unallocated upper channels 18, while the other amplifier provides downstream (signals from the distribution hub 22 to system users 26) amplification for the cable TV signals 14. Each system user 26 has a user interface noise transmitter circuit 32 which is typically located within a user interface circuit which also contains suitable circuitry to provide communication with the distribution hub 22. The user interface noise transmitter circuit 32 is coupled to the local drop 24.

As has been explained above, there is a portion(s) of the available cable bandwidth 10 which can be allocated for data transmission by the system users 26. These portions include the back channel 12 as well as the upper bandwidth 18 which are not allocated for use by the cable TV signals 14. Further, an unused channel within the cable TV signals 14 can also be allocated for data transmission by the system users 26. When there is more than one system user 26 contention in establishing the allocation can occur.

When there is more than one system user 26, a system or scheme to resolve the connection for access to the data channel must be provided. One such system that is currently utilized is known as the countdown scheme.

Essentially, the countdown scheme utilizes a unique binary address assigned to each user to bid for the resource (data channel). Each user that desires to contend for the resource transmits a signal on the trunk cable 20 corresponding to the value of the highest bit of their address. Users that transmit a "0" bit value drop out of the bidding, provided they detect that there is a user transmitting a "1" who is also contending, each user that has a "1" bit value continue bidding against each other with the next highest bit. The bidding continues until only one user remains.

The countdown scheme can be best understood from going through a detailed example with three system users 26, which shall be called USER1, USER2 and USER3. Each system user 26 has a unique address assigned to them. In our example, USER1 is assigned the binary address 11010, USER2 is assigned the binary address 11100 and USER3 is assigned the binary address 00011. Each system user 26 that desires allocation of the data channel transmits a signal corresponding to the bit value of the address on the cable trunk 20 starting with the highest order bit. The system users 26 transmit the highest order bit value of their address ("1" for USER1, "1" for USER2, and "0" for USER3) on the cable trunk 20. USER1 and USER2 are now contending for the data channel. USER3 transmitted a "0" on the cable trunk 20 and drops out of the bidding because the other system users have transmitted a "1" on the cable trunk 20. USER1 and USER2 continue to contend for access of the data channel, transmitting the second highest order bit value of their address ("1" for USER1 and "1" for USER2) on the cable trunk 20. USER1 and USER2 are still contending for the data channel. The bidding continues until only one system user is contending for the data channel. USER1 and USER2 continue to contend for access of the data channel, transmitting the third highest order bit value of their address ("0" for USER1 and "1" for USER2) on the cable trunk 20. USER1 transmitted a "0" on the cable trunk 20 and drops out of the bidding because another system user, USER2 has transmitted a "1" on the cable trunk 20. USER2 will win the bidding and will be given access to the data channel after all the the users address bits have been transmitted.

The bit value "1" represents energy applied and "0" represents no energy applied to the cable. The conventional way of transmitting the bit value "1" on the cable in a wired or bus involves transmitting a tone of a common predetermined frequency on the cable.

In accordance with a first embodiment of the invention, the system users 26 are each assigned a unique id number. Each system user 26 generates a unique contention tone T which is a particular frequency calculated by utilizing equation 1.

$$T = B + (A*I)$$ Equation 1.

Referring to Equation 1, T is a contention tone, B a base frequency, A a step frequency (such as 10 to 15 MHz), and I is a unique user id number.

When the system users 26 want access for the data channel, they contend by placing their unique contention tone T on the trunk cable 20. Each system user 26 then checks to determine if another system user 26 having a higher unique id number is contending. This may be done by direct filtering or by mixing down to an intermediate frequency. If there is not another system user 26, having a higher unique id number, then the contending system user 26 has access to the data channel.

The contention time, base frequency B and step frequency A are derived from a carrier signal sent from the distribution hub 22 of the cable TV plant. The carrier signal is the frequency for a system user 26 with a zero value for the unique id number. The unique contention tones T that are placed on the trunk cable 20 may be phase locked to the carrier signal.

After access contention is resolved, the system user 26 which has access to the data channel, transmits data by an appropriate method. The data transmission can utilize Frequency Shift Keying (FSK), Quadrature Amplitude Modulation (QAM) or other modulation schemes.

With conventional cable TV apparatus and bandwidth this embodiment of the invention would typically be limited to less than approximately 20 simultaneous system users 26 that desire access to the data channel. However, greater than 20 system users 26 can be employed if additional bandwidth is available and/or narrower signal bandwidth is used for signaling contention.

A second embodiment of the invention does not have any substantial limitations on the number of system users 26. In such an embodiment, each system user has a unique id number. The transmission is assumed to be unidirectional. When a system user 26 desires to contend for access to the data channel, the system user 26 waits to detect a contention time signal which is provided by the distribution hub 22. When the contention time signal is detected, a system user 26 that desires access to the data channel contends. Contention is done for example, using a count down scheme by transmitting a signal corresponding to the bit value of the address on the cable trunk 20, starting with the highest order bit. This scheme is substantially similar to the previously described count down scheme example involving three system users 26.

Essentially, the countdown scheme utilizes a unique binary address assigned to each user to bid for the resource (data channel). Each user that desires to content for the resource expresses a signal corresponding to the value of the highest bit of their address. Users that have a "0" bit value drop out of the bidding, provided they know that there is a user having a "1" who is also contending, while the users that have a "1" bit value continue bidding against each other with the next highest bit. The bidding continues until only one user remains.

However, in order to avoid the phase cancellation problem with multiple contending system users 26 described above, a system user 26 indicates a "1" by transmitting band limited noise, such as band limited White Noise, on the trunk cable 20. The band limited noise is applied for a period of time long enough so that statistically there is a sufficiently low probability of the signal not crossing a threshold. Essentially, the band limited noise is statistically unique for each user. Accordingly, if the system users 26 transmit the band limited noise contention signal for a value "1" and no signal for a value "0" then the distribution hub 22 would detect a contention signal of value "1" if at least one contenting system user transmits a value "1". Such a result occurs because White Gaussian noise added to White Gaussian noise produces White Gaussian noise. In response, the distribution hub 22 will transmit in the downstream direction, an ordinary data signal corresponding to the value of "1" or "0" which was transmitted upstream. The bidding continues with system users that applied a "1", while system users that applied a "0" drop out, until only one system user remains contending for the data channel.

The presence of noise on the trunk cable 20, above a predetermined threshold, is considered a "1" and the absence of noise is considered a "0". However, band limited Gaussian white noise signal can remain below the threshold for a short period of time and cause a false "0". In addition, line noise on the trunk cable 20 can cause a "0" to be erroneously interpreted as a "1". The present invention handles both errors harmlessly, resulting only in a lost contention cycle. When an erroneous "0" is detected, all contending users sending a "1", but detecting a "0" drop out of contention. When an erroneous "1" is detected, the contending users, all are sending "0" otherwise the "1" would not be erroneous, drop out resulting in a lost contention cycle. When the lost contention cycles are sufficiently rare, which is the case when the trunk cable 20 is not too noisy, efficiency is maintained. Contention can be in parallel with data transmission system in that they each can utilize a different frequency band of the available cable bandwidth 10.

Figure 3:
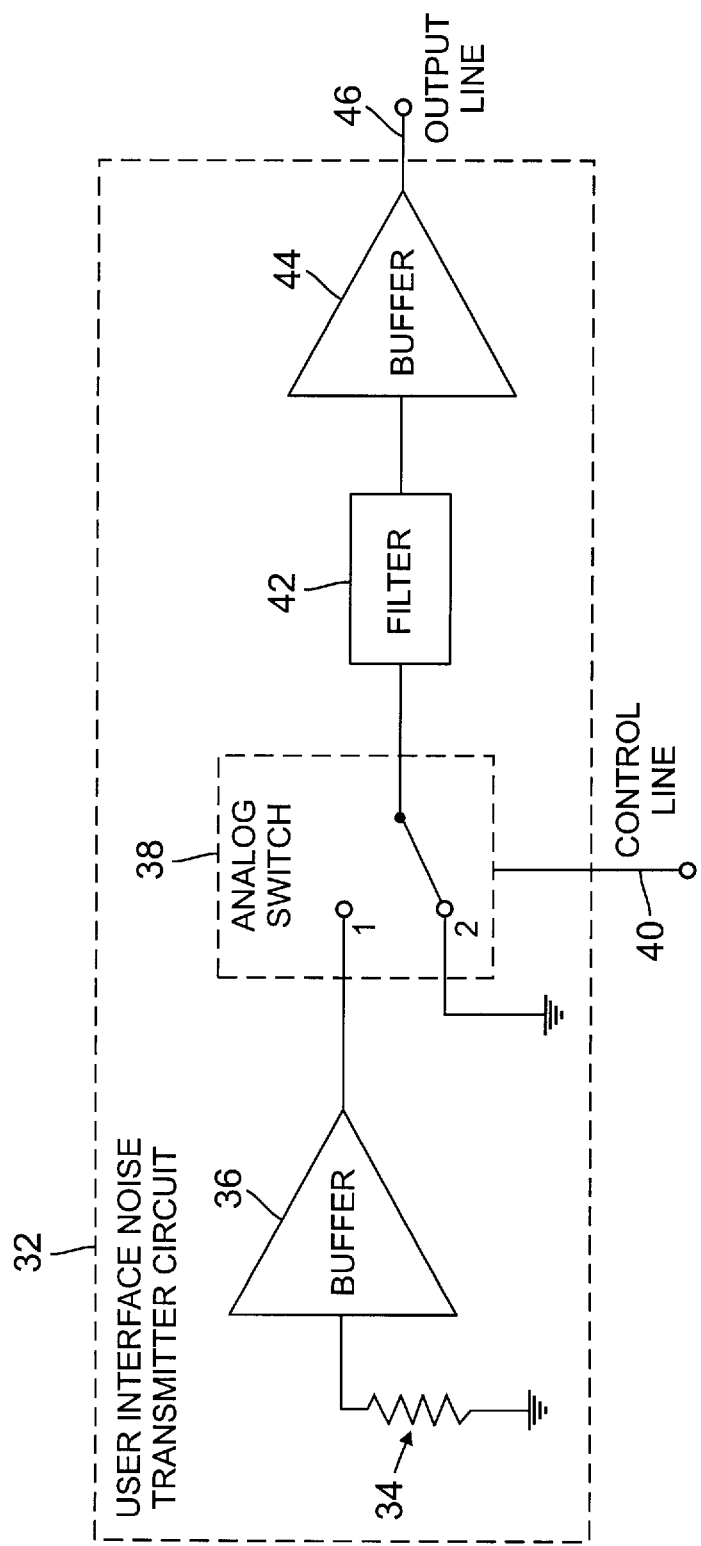
FIG. 3 shows a schematic illustration of an exemplary user interface noise transmitter circuit for use by a system user in the cable TV plant of FIG. 2.

Contention in the upstream direction is accomplished by means of a band limited White Gaussian Noise source that can be on-off modulated. Referring to FIG. 3 in conjunction with FIG. 2, there is shown a schematic of an exemplary user interface noise transmitter circuit 32 which is typically located in a user interface circuit at the system user 26 and has an output line 46 coupled to the associated local drop 24. A resistor 34 is used as a noise source. The resistor 34 is coupled to a buffer 36, the output of which is coupled to a first input of an analog switch 38. A second input of the analog switch 38 is coupled to ground. The analog switch 38 is responsive to a signal from a control line 40, such that when a "1" is desired the output of the buffer 36 is selected and when a "0" is desired the ground is selected. The output of the analog switch 38 is coupled to the input of a filter 42. The filter 42 has a 500 KHz bandwidth and a center frequency of 20 MHz. An 8 pole active filter is used and can be tuned to do experiments with bandwidth or with center frequency. A passive filter can equally well be used at lower cost. Baseband White Gaussian Noise mixed with a local oscillator signal will have 2 side bands that are not statistically independent. Therefore, it would require twice the bandwidth to produce the same statistics. The active filters also provide a signal gain of on the order of 10,000 (voltage gain). The active filters are well known to those skilled in the art and are described in, for example, Donald Fink & Donald Christiansen, *Electronics Engineering Handbook* pp. 12–34 to 12–49 (McGraw Hill 1989), which is incorporated by reference herein. The active filters are constructed as four sections of two pole filters. The output of the filter 42, which is now band limited noise when the first position of the analog switch 38 is selected, is coupled to buffer 44. The output of the buffer 44 is coupled to an output line 46 which is coupled to the local drop 24. Such a circuit correlates for no more than approximately the inverse of the bandwidth of the frequency panel that is being used to contend.

Figure 4:
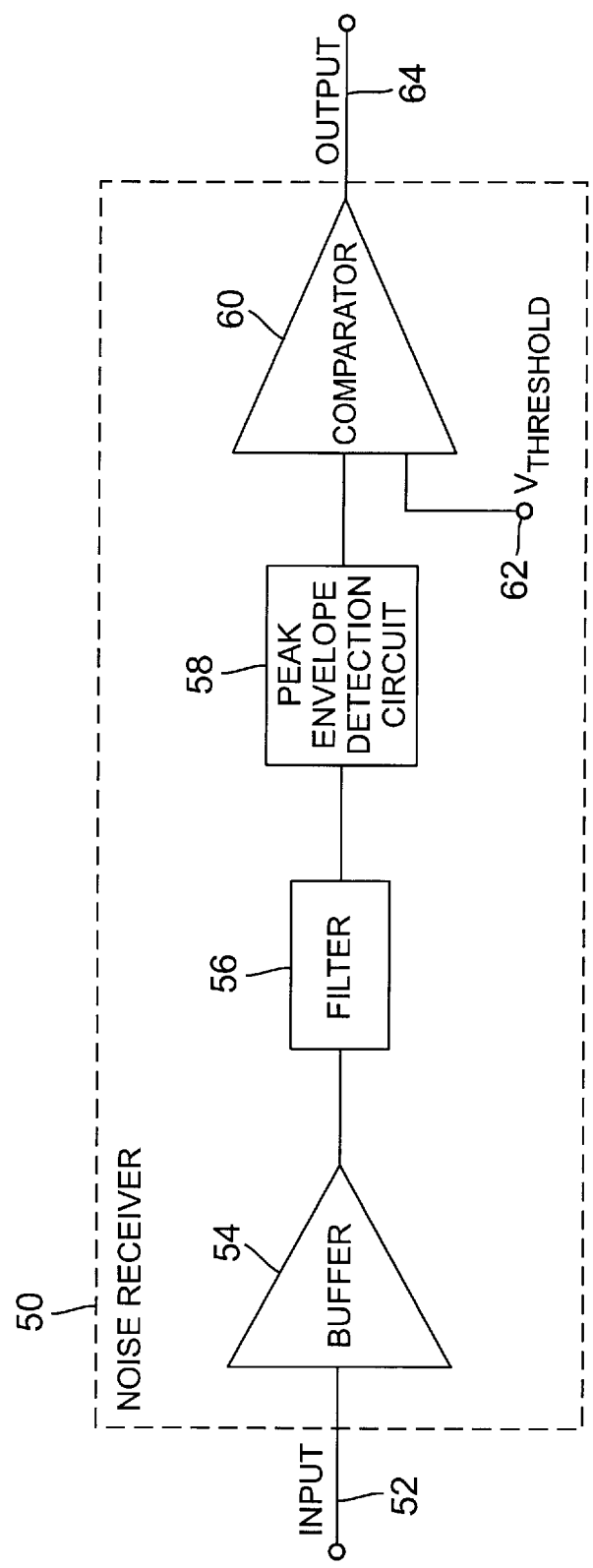
FIG. 4 shows a schematic illustration of an exemplary noise receiver for use in a distribution hub of the cable TV plant of FIG. 2.

Referring to FIG. 4, an exemplary noise receiver 50 contained in the distribution hub 22 is shown. The noise receiver 50 determines whether a "1" or a "0" has been applied to the trunk cable 20 by the user interface contention circuit 32 during a particular bit interval. The noise receiver 50 has an input line 52, which is adapted to receive a signal applied to the trunk cable 20. The input line 52 is coupled to an input of a buffer amplifier 54. A filter 56 with lower gain, is coupled to an output of the buffer amplifier 54. A peak envelope detection circuit 58, which is reset at the end of each bit time is coupled to the output of the filter 56. One input of a comparator 60 is coupled to the output of the peak envelope detector circuit 58. Another input of the comparator 60 is coupled to a predetermined threshold $V_{THRESHOLD}$. An output of the comparator 60 is coupled to an output line 64. The peak envelope detector circuit 58 determines the maximum positive excursion of the noise during a bit interval. If the peak is above the predetermined threshold level $V_{THRESHOLD}$, then the output line 64 has the value of "1". The predetermined threshold level $V_{THRESHOLD}$ is preferably chosen so that the number of false "1"s from line noise is not greater than the number of false "0"s. A power of two improvement in the probability of a false "0" being detected can be gained by making a circuit that additionally looks for negative peaks below a threshold.

A detailed discussion of the Gaussian Noise Model and how long the time period should be for different probabilities can be found in "Distribution of the Duration of Fades in Radio Transmission: Gaussian Noise Model", *Bell Systems Technical Journal*, Vol. 37 No. 3 pp. 581–635 (May 1958), incorporated by reference herein. Essentially, the probability that the envelope of band limited Gaussian White Noise not will exceed a threshold is a function of the RMS signal value, the bandwidth of the noise and the time spent observing the signal.

Probability of Signal < R for time $t$ =    Equation 2

$$(1/(\Pi*\Pi*\sqrt{2*}))*((R/(t*w))**3).$$

Referring to Equation 2, R<<1 and R is the normalized signal level (RMS input normalized to 1), t is time in seconds and w is the bandwidth in Hz. The probability of falsely detecting a "0" is proportional to one over the cube of the bit time as well as one over the cube of the bandwidth. R must be selected high enough so that the line noise creates false "1"s no more often then the statistical nature of the signal creates false "0"s.

The contention technique in accordance with the present invention using bandlimited noise signaling was described with respect to a countdown contention scheme for ease of discussion purposes only and is not meant to be a limitation on the present invention. It should be readily understood that this contention technique is useful for schemes similar to the countdown scheme which utilize a modified address. For instance, other schemes that do not favor the highest numbered contending port as in the countdown scheme can use the contention signaling of the present invention including the schemes described in U.S. Pat. No. 5,088,024, incorporated by reference herein.

Numerous modifications and alternative embodiments of the invention will be apparent of those skilled in the art in view of the foregoing description. Accordingly, this description is to be construed as illustrative only and is for the purpose of teaching those skilled in the art the best mode of carrying out the invention. Details of the structure may be varied substantially without departing from the spirit of the invention and the exclusive use of all modifications which come within the scope of the appended claim is reserved.

I claim:

1. A user interface coupled to a broadband network having a plurality of user interfaces and a distribution hub, said user interface comprising:

a contention circuit for generating a contention signal in substantial absence of a common frequency with other user interfaces, wherein said contention signal is an active contention request for allocation of a data channel on said broadband network; and a sensor for sensing other contention signals on said broadband network, wherein said sensor determines a status of said active contention request.

2. The apparatus as recited in claim 1 wherein said contention signal is related to a unique id number.

3. The apparatus as recited in claim 2 wherein said contention signal is a contention tone signal based on a multiple of a step frequency relative to a base frequency and wherein said multiple is related to said unique id number.

4. The apparatus as recited in claim 2 wherein a contending user having a highest unique id number has access to said data channel.

5. The apparatus as recited in claim 1 wherein said sensor comprises a direct filter and a detection circuit for determining when a higher contention tone signal than said contention tone signal has been generated by said other user interfaces.

6. The apparatus as recited in claim 3 wherein said base frequency is a function of a carrier signal provided from said distribution hub.

7. The apparatus as recited in claim 3 wherein said step frequency is a function of a carrier signal provided from said distribution hub.

8. The apparatus as recited in claim 1 wherein each of said plurality of said user interfaces employs a unique binary address to bid for said data channel by expressing a signal corresponding to a value of a bit of said unique binary address, each of said plurality of user interfaces having a "0" bit value drops out of the bidding while each of said plurality of user interfaces having a "1" bit value continues bidding with a next bit, continuing until only one of said plurality of said user interfaces remains.

9. The apparatus as recited in claim 8 wherein each of said plurality of user interfaces having a "1" bit value and detecting an erroneous "0" bit value drop out of bidding.

10. The apparatus as recited in claim 1 wherein said contention signal comprises a band limited noise signal.

11. The apparatus as recited in claim 10 wherein said band limited noise signal is a band limited white noise signal.

12. The apparatus as recited in claim 10 wherein said band limited noise is resistor thermal noise processed by a band pass filter and amplified.

13. A method for allocating a data channel in a broadband network having a plurality of user interfaces and a distribution hub, the method comprising the steps of:

generating a contention signal at one of the plurality of user interfaces in substantial absence of a common frequency with other user interfaces, wherein said contention signal is an active contention request for allocation of a data channel on said broadband network; and sensing other contention signals on said broadband network, determining a status of said active contention request.

14. The method as recited in claim 13 further comprising the steps of:

assigning a unique id number to each of said user interfaces; and generating said contention signal in relationship to said unique id number.

15. The method as recited in claim 14 wherein the step of generating said contention signal comprises generating a contention tone signal based on a multiple of a step frequency relative to a base frequency and wherein said multiple is related to said unique id number.

16. The method as recited in claim 13 comprises the additional step of granting a contending user having a highest unique id number access to said data channel.

17. The method as recited in claim 13 wherein the step of sensing comprises filtering and detecting for determining when a higher contention tone signal has been generated by said other user interfaces.

18. The method as recited in claim 15 comprising the additional step of deriving said base frequency as a function of a carrier signal provided from said distribution hub.

19. The method as recited in claim 15 comprising the additional step of deriving said step frequency as a function of a carrier signal provided from said distribution hub.

20. The method as recited in claim 13 comprising the additional step of employing a unique binary address to bid for said data channel by expressing a signal corresponding to a value of a bit of said unique binary address, each of said plurality of user interfaces having a "0" bit value dropping out of the bidding while each of said plurality of user interfaces having a "1" bit value bidding with a next bit, continuing until only one of said plurality of said user interfaces remains.

21. The method as recited in claim 20 comprising the additional step of dropping out of bidding by each of said plurality of user interfaces having a "1" bit value and detecting an erroneous "0" bit value drop out of bidding.

22. The method as recited in claim 13 wherein the step of generating said contention signal comprises generating a band limited noise.

23. The method as recited in claim 22 wherein said band limited noise is a white noise signal.

24. The method as recited in claim 22 wherein the step of generating said band limited noise comprises generating a resistor thermal noise and processing said resistor thermal noise with a band pass filter.

* * * * *